(12) United States Patent
Chishti et al.

(10) Patent No.: US 8,699,694 B2
(45) Date of Patent: *Apr. 15, 2014

(54) PRECALCULATED CALLER-AGENT PAIRS FOR A CALL CENTER ROUTING SYSTEM

(75) Inventors: Zia Chishti, Washington, DC (US); S. James P. Spottiswoode, Beverly Hills, CA (US)

(73) Assignee: Satmap International Holdings Limited, Hamilton (BM)

( * ) Notice: Subject to any disclaimer, the term of this patent is extended or adjusted under 35 U.S.C. 154(b) by 488 days.

This patent is subject to a terminal disclaimer.

(21) Appl. No.: 12/869,654

(22) Filed: Aug. 26, 2010

(65) Prior Publication Data

US 2012/0051537 A1    Mar. 1, 2012

(51) Int. Cl.
*H04M 3/523* (2006.01)

(52) U.S. Cl.
USPC ............ 379/265.11; 379/265.06; 379/265.12; 379/266.01

(58) Field of Classification Search
USPC ............................................ 379/265.1–266.1
See application file for complete search history.

(56) References Cited

U.S. PATENT DOCUMENTS

| | | | |
|---|---|---|---|
| 5,155,763 A | 10/1992 | Bigus et al. | |
| 5,206,903 A | 4/1993 | Kohler et al. | |
| 5,702,253 A | 12/1997 | Bryce et al. | |
| 5,825,869 A | 10/1998 | Brooks et al. | |
| 5,903,641 A | 5/1999 | Tonisson | |
| 5,926,538 A | 7/1999 | Deryugin et al. | |
| 6,052,460 A | 4/2000 | Fisher et al. | |
| 6,064,731 A | 5/2000 | Flockhart et al. | |
| 6,163,607 A | 12/2000 | Bogart et al. | |
| 6,222,919 B1 | 4/2001 | Hollatz et al. | |
| 6,324,282 B1 | 11/2001 | McIllwaine et al. | |
| 6,333,979 B1 | 12/2001 | Bondi et al. | |
| 6,389,132 B1 | 5/2002 | Price | |

(Continued)

FOREIGN PATENT DOCUMENTS

| | | |
|---|---|---|
| EP | 0 493 292 A2 | 7/1992 |
| EP | 0 949 793 A1 | 10/1999 |

(Continued)

OTHER PUBLICATIONS

International Search Report dated Jun. 14, 2013 issued in connection with PCT/US2013/033261.

(Continued)

*Primary Examiner* — Mohammad Islam
(74) *Attorney, Agent, or Firm* — Foley & Lardner LLP (57) ABSTRACT

Systems and methods are disclosed for preprocessing caller-agent pairs in a contact routing center, along with an intelligent routing system. A method includes determining at least one agent data for each agent of a set of agents, determining at least one caller data for each caller of a set of callers, and determining a score for each possible caller-agent pair of the set of agents and the set of callers using the agent data and the caller data in a pattern matching algorithm. The scores for each possible caller-agent pair may then be stored, e.g., in a look-up table, for retrieval, where matching a caller of the set of callers to an agent of the set of agents is based on the previously determined or calculated scores. For example, the caller-agent pair having the best score of all potential caller-agent pairs may be connected.

28 Claims, 6 Drawing Sheets

(56) References Cited

U.S. PATENT DOCUMENTS

| | | | |
|---|---|---|---|
| 6,389,400 B1 | 5/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,639,976 B1 | 10/2003 | Shellum et al. | |
| 6,661,889 B1 | 12/2003 | Flockhart et al. | |
| 6,704,410 B1 * | 3/2004 | McFarlane et al. | 379/265.05 |
| 6,714,643 B1 | 3/2004 | Gargeya et al. | |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,092,509 B1 | 8/2006 | Mears et al. | |
| 7,103,172 B2 | 9/2006 | Brown et al. | |
| 7,209,549 B2 | 4/2007 | Reynolds et al. | |
| 7,231,032 B2 | 6/2007 | Nevman et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,229,102 B2 | 7/2012 | Knott et al. | |
| 8,295,471 B2 | 10/2012 | Spottiswoode et al. | |
| 8,300,798 B1 | 10/2012 | Wu et al. | |
| 2002/0018554 A1 | 2/2002 | Jensen et al. | |
| 2002/0046030 A1 | 4/2002 | Haritsa et al. | |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2003/0002653 A1 | 1/2003 | Uckun | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0101127 A1 | 5/2004 | Dezonno et al. | |
| 2004/0109555 A1 | 6/2004 | Williams | |
| 2004/0133434 A1 | 7/2004 | Szlam et al. | |
| 2004/0210475 A1 | 10/2004 | Starnes et al. | |
| 2004/0230438 A1 | 11/2004 | Pasquale et al. | |
| 2004/0267816 A1 | 12/2004 | Russek | |
| 2005/0043986 A1 | 2/2005 | McConnell et al. | |
| 2005/0129212 A1 | 6/2005 | Parker | |
| 2005/0135596 A1 | 6/2005 | Zhao | |
| 2005/0187802 A1 | 8/2005 | Koeppel | |
| 2005/0195960 A1 | 9/2005 | Shaffer et al. | |
| 2005/0286709 A1 | 12/2005 | Horton et al. | |
| 2006/0098803 A1 | 5/2006 | Bushey et al. | |
| 2006/0110052 A1 | 5/2006 | Finlayson | |
| 2006/0124113 A1 | 6/2006 | Roberts, Sr. | |
| 2006/0184040 A1 | 8/2006 | Keller et al. | |
| 2006/0222164 A1 | 10/2006 | Contractor et al. | |
| 2006/0262918 A1 | 11/2006 | Karnalkar et al. | |
| 2006/0262922 A1 | 11/2006 | Margulies et al. | |
| 2007/0036323 A1 | 2/2007 | Travis | |
| 2007/0071222 A1 | 3/2007 | Flockhart et al. | |
| 2007/0121829 A1 | 5/2007 | Tal et al. | |
| 2007/0154007 A1 | 7/2007 | Bernhard | |
| 2007/0198322 A1 | 8/2007 | Bourne et al. | |
| 2007/0274502 A1 | 11/2007 | Brown | |
| 2008/0002823 A1 | 1/2008 | Fama et al. | |
| 2008/0008309 A1 | 1/2008 | Dezonno et al. | |
| 2008/0046386 A1 | 2/2008 | Pieraccinii et al. | |
| 2008/0065476 A1 | 3/2008 | Klein et al. | |
| 2008/0152122 A1 | 6/2008 | Idan et al. | |
| 2008/0181389 A1 | 7/2008 | Bourne et al. | |
| 2008/0199000 A1 * | 8/2008 | Su et al. | 379/265.06 |
| 2008/0267386 A1 | 10/2008 | Cooper | |
| 2008/0273687 A1 | 11/2008 | Knott et al. | |
| 2009/0043670 A1 | 2/2009 | Johansson et al. | |
| 2009/0086933 A1 | 4/2009 | Patel et al. | |
| 2009/0190740 A1 | 7/2009 | Chishti et al. | |
| 2009/0190743 A1 | 7/2009 | Spottiswoode | |
| 2009/0190744 A1 | 7/2009 | Xie et al. | |
| 2009/0190745 A1 | 7/2009 | Xie et al. | |
| 2009/0190746 A1 | 7/2009 | Chishti et al. | |
| 2009/0190747 A1 | 7/2009 | Spottiswoode | |
| 2009/0190748 A1 | 7/2009 | Chishti et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Hassine | |
| 2009/0304172 A1 | 12/2009 | Becerra et al. | |
| 2009/0318111 A1 | 12/2009 | Desai et al. | |
| 2009/0323921 A1 | 12/2009 | Spottiswoode et al. | |
| 2010/0020959 A1 | 1/2010 | Spottiswoode | |
| 2010/0020961 A1 | 1/2010 | Spottiswoode | |
| 2010/0054452 A1 | 3/2010 | Afzal | |
| 2010/0054453 A1 | 3/2010 | Stewart | |
| 2010/0111285 A1 | 5/2010 | Chishti | |
| 2010/0111286 A1 | 5/2010 | Chishti | |
| 2010/0111287 A1 | 5/2010 | Xie et al. | |
| 2010/0111288 A1 | 5/2010 | Afzal et al. | |
| 2010/0142698 A1 | 6/2010 | Spottiswoode et al. | |
| 2010/0183138 A1 | 7/2010 | Spottiswoode et al. | |
| 2011/0022357 A1 | 1/2011 | Vock et al. | |
| 2011/0069821 A1 | 3/2011 | Korolev et al. | |
| 2011/0125048 A1 | 5/2011 | Causevic et al. | |
| 2012/0051536 A1 | 3/2012 | Chishti et al. | |
| 2012/0278136 A1 | 11/2012 | Flockhart et al. | |
| 2013/0003959 A1 | 1/2013 | Nishikawa et al. | |

FOREIGN PATENT DOCUMENTS

| | | |
|---|---|---|
| EP | 1 032 188 A1 | 8/2000 |
| JP | 2000-078292 | 3/2000 |
| JP | 2000-092213 | 3/2000 |
| JP | 2000-236393 | 8/2000 |
| JP | 2001-292236 | 10/2001 |
| JP | 2001-518753 | 10/2001 |
| JP | 2002-297900 | 10/2002 |
| JP | 3366565 | 1/2003 |
| JP | 2004-227228 | 8/2004 |
| JP | 2007-324708 | 12/2007 |
| WO | WO-99/17517 | 4/1999 |
| WO | WO-01/63894 | 8/2001 |

(56) References Cited

FOREIGN PATENT DOCUMENTS

| WO | WO-2006/124113 A2 | 11/2006 |
|---|---|---|
| WO | WO-2010/053701 A2 | 5/2010 |
| WO | WO-2011/081514 | 7/2011 |

OTHER PUBLICATIONS

International Search Report mailed Jul. 9, 2013 issued in connection with PCT/US2013/33265.
Notice of Allowance mailed Jul. 8, 2013, issued in connection with U.S. Appl. No. 13/843,541.
Notification of Transmittal of the International Search Report and the Written Opinion of the International Searching Authority, or the Declaration mailed Jul. 9, 2013 issued in connection with PCT/US2013/33265.
Ntzoufras, "Bayesian Modeling Using Winbugs". Wiley Interscience, Oct. 18, 2007.
Office Action dated Jun. 27, 2013 issued in connection with U.S. Appl. No. 12/869,645.
Office Action dated Jun. 7, 2013 issued in connection with Japanese Patent Application No. 2010-544399.
Office Action mailed Jul. 2, 2013 in connection with Mexican Application No. MX/a/2010/008238.
Written Opinion dated Jun. 14, 2013 issued in connection with PCT/US2013/033261.
Written Opinion of the International Searching Authority mailed Jul. 9, 2013 issued in connection with PCT/US2013/33265.
U.S. Appl. No. 13/221,692, filed Aug. 30, 2011, Spottiswoode et al.
U.S. Appl. No. 13/715,765, filed Dec. 14, 2012, Zia Chishti et al.
U.S. Appl. No. 13/843,541, filed Mar. 15, 2013, Zia Chisti et al.
U.S. Appl. No. 13/843,724, filed Mar. 14, 2013, Spottiswoode et al.
U.S. Appl. No. 13/843,807, filed Mar. 15, 2013, Spottiswoode et al.
U.S. Appl. No. 13/854,825, filed Apr. 14, 2013, Zia Chisti et al.
Anonymous. (2006) "Performance Based Routing in Profit Call Centers," The Decision Makers' Direct, located at www.decisioncraft.com, Issue Jan. 6, 2012, three pages.
Gans, N. et al. (2003). "Telephone Call Centers: Tutorial, Review and Research Prospects," Manuscript, pp. 1-81.
International Search Report dated May 31, 2013 issued in connection with International Application No. PCT/US 13/33268.
International Search Report mailed Jul. 6, 2010 issued in connection with PCT/US2009/061537.
International Search Report mailed on Feb. 24, 2010, for PCT Application No. PCT/US2009/066254, filed on Dec. 1, 2009, 4 pages.
International Search Report mailed on Jun. 3, 2009, for PCT Application No. PCT/US2009/031611, filed on Jan. 21,2009, 5 pages.
International Search Report mailed on Mar. 12, 2010, for PCT Application No. PCT/US2009/054352, filed on Aug. 19, 2009, 5 pages.
International Search Report mailed on Mar. 13, 2009, for PCT Application No. PCT/US2008/077042, filed on Sep. 19, 2008, 2 pages.
Koole, G. (2004). "Performance Analysis and Optimization in Customer Contact Centers," Proceedings of the Quantitative Evaluation of Systems, First International Conference, Sep. 27-30, 2004, four pages.
Koole, G. et al. (Mar. 6, 2006). "An Overview of Routing and Staffing Algorithms in Multi-Skill Customer Contact Centers," Manuscript, 42 pages.
Notice of Allowance dated Jun. 29, 2012 issued in connection with U.S. Appl. No. 12/355,618.
Notice of Allowance dated Sep. 19, 2012 issued in connection with U.S. Appl. No. 12/180,382.
Notice of Allowance dated Feb. 28, 2013 issued in connection with U.S. Appl. No. 12/331,201.
Notice of Allowance dated Apr. 10, 2013 issued in connection with U.S. Appl. No. 12/266,461.
Office Action dated Jan. 19, 2012 issued in connection with U.S. Appl. No. 12/266,415.
Office Action dated Jan. 23, 2012 issued in connection with U.S. Appl. No. 12/331,186.
Office Action dated Feb. 3, 2012 issued in connection with U.S. Appl. No. 12/202,091.
Office Action dated Feb. 3, 2012 issued in connection with U.S. Appl. No. 12/202,097.
Office Action dated Mar. 1, 2012 issued in connection with U.S. Appl. No. 12/180,382.
Office Action dated Mar. 2, 2012 issued in connection with U.S. Appl. No. 12/267,459.
Office Action dated Mar. 15, 2012 issued in connection with U.S. Appl. No. 12/202,101.
Office Action dated Mar. 19, 2012 issued in connection with U.S. Appl. No. 12/490,949.
Office Action dated Mar. 30, 2012 issued in connection with U.S. Appl. No. 12/267,471.
Office Action dated Apr. 6, 2012 issued in connection with U.S. Appl. No. 12/021,251.
Office Action dated Apr. 16, 2012 issued in connection with U.S. Appl. No. 12/331,210.
Office Action dated Apr. 18, 2012 issued in connection with U.S. Appl. No. 12/266,418.
Office Action dated May 11, 2012 issued in connection with U.S. Appl. No. 12/266,415.
Office Action dated May 11, 2012 issued in connection with U.S. Appl. No. 12/331,195.
Office Action dated Jun. 7, 2012 issued in connection with U.S. Appl. No. 12/331,181.
Office Action dated Jun. 7, 2012 issued in connection with U.S. Appl. No. 12/355,602.
Office Action dated Jun. 8, 2012 issued in connection with U.S. Appl. No. 12/266,446.
Office Action dated Jun. 18, 2012 issued in connection with U.S. Appl. No. 12/331,201.
Office Action dated Jun. 29, 2012 issued in connection with U.S. Appl. No. 12/331,153.
Office Action dated Aug. 4, 2011 issued in connection with U.S. Appl. No. 12/267,459.
Office Action dated Aug. 9, 2011 issued in connection with U.S. Appl. No. 12/202,101.
Office Action dated Aug. 19, 2011 issued in connection with U.S. Appl. No. 12/202,097.
Office Action dated Aug. 19, 2011 issued in connection with U.S. Appl. No. 12/331,186.
Office Action dated Aug. 23, 2011 issued in connection with U.S. Appl. No. 12/180,382.
Office Action dated Sep. 6, 2011 issued in connection with U.S. Appl. No. 12/202,091.
Office Action dated Sep. 12, 2011 issued in connection with U.S. Appl. No. 12/266,446.
Office Action dated Sep. 13, 2011 issued in connection with U.S. Appl. No. 12/331,181.
Office Action dated Sep. 15, 2011 issued in connection with U.S. Appl. No. 12/266,418.
Office Action dated Sep. 19, 2011 issued in connection with U.S. Appl. No. 12/021,251.
Office Action dated Sep. 23, 2011 issued in connection with U.S. Appl. No. 12/355,602.
Office Action dated Sep. 26, 2011 issued in connection with U.S. Appl. No. 12/331,153.
Office Action dated Sep. 26, 2011 issued in connection with U.S. Appl. No. 12/355,618.
Office Action dated Jan. 15, 2013 issued in connection with U.S. Appl. No. 12/267,471.
Office Action dated Jan. 3, 2013 issued in connection with U.S. Appl. No. 12/331,210.
Office Action dated Jan. 30, 2013 issued in connection with Chinese Application No. 20098011060.8, with English translation.
Office Action dated Jan. 31, 2013 issued in connection with U.S. Appl. No. 12/331,161.
Office Action dated Oct. 7, 2011 issued in connection with U.S. Appl. No. 12/331,195.
Office Action dated Oct. 7, 2011 issued in connection with U.S. Appl. No. 12/331,210.

(56) References Cited

OTHER PUBLICATIONS

Office Action dated Oct. 9, 2012 issued in connection with U.S. Appl. No. 12/202,101.
Office Action dated Oct. 11, 2012 issued in connection with U.S. Appl. No. 12/267,459.
Office Action dated Oct. 29, 2012 issued in connection with U.S. Appl. No. 12/490,949.
Office Action dated Nov. 1, 2012 issued in connection with Chinese Application No. 200880128336.9, with English translation.
Office Action dated Nov. 1, 2012 issued in connection with Mexican Application No. MX/a/2010/008238.
Office Action dated Nov. 1, 2012 issued in connection with Mexican Application No. MX/a/2011/002272.
Office Action dated Dec. 13, 2012 issued in connection with U.S. Appl. No. 12/355,602.
Office Action dated Dec. 28, 2012 issued in connection with U.S. Appl. No. 12/266,461.
Office Action dated Dec. 31, 2012 issued in connection with U.S. Appl. No. 12/869,645.
Office Action dated Feb. 21, 2013 issued in connection with Japanese Patent Application No. 2010-544292.
Office Action dated Mar. 28, 2013 issued in connection with U.S. Appl. No. 13/221,692.
Office Action dated Aug. 31, 2012 issued in connection with Mexican Patent Application No. MX/a/2011/004815.
Office Action dated Jan. 8, 2013 issued in connection with Australian Patent Application No. 2008349500.
Office Action dated Jan. 8, 2013 issued in connection with Australian Patent Application No. 2009209317.
Office Action dated Mar. 20, 2013 issued in connection with U.S. Appl. No. 12/331,153.
Office Action dated May 21, 2013 issued in connection with U.S. Appl. No. 12/267,459.
Office Action mailed Apr. 24, 2013 issued in connection with Mexican Patent Application No. MX/a/2011/004815.
Riedmiller, M. et al. (1993). "A Direct Adaptive Method for Faster BackpropagationLearning: The RPROP Algorithm," 1993 IEEE International Conference on Neural Networks, San Francisco, CA, Mar. 28-Apr. 1, 1993, 1:586-591.
Written Opinion dated May 31, 2013 issued in connection with International Application No. PCT/US13/33268.
Written Opinion mailed Jun. 10, 2010 issued in connection with PCT/US2009/061537.
Written Opinion mailed on Feb. 24, 2010, for PCT Application No. PCT/US2009/066254, filed on Dec. 1, 2009, 6 pages.
Written Opinion mailed on Jun. 3, 2009, for PCT Application No. PCT/US2009/031611, filed Jan. 21, 2009, 8 pages.
Written Opinion mailed on Mar. 12, 2010, for PCT Application No. PCT/US2009/054352, filed Aug. 19, 2009, 6 pages.
Written Opinion mailed on Mar. 13, 2009, for PCT Application No. PCT/US2008/077042, filed Sep. 19, 2008, 6 pages.
Notice of Allowance dated Oct. 4, 2013 issued in connection with U.S. Appl. No. 12/202,101.
Notice of Allowance dated Sep. 18, 2013 issued in connection with U.S. Appl. No. 12/331,153.
Notice of Allowance dated Sep. 5, 2013 issued in connection with U.S. Appl. No. 12/331,161.
Office Action dated Oct. 21, 2013 issued in connection with U.S. Appl. No. 12/331,210.
Office Action dated Jul. 5, 2013 issued in connection with Mexican Application No. MX/a/2011/002272.
Office Action dated Jul. 9, 2013 issued in connection with Chinese Application No. 200980142771.1, with English translation.
Office Action dated Aug. 13, 2013 issued in connection with U.S. Appl. No. 13/854,825.
Office Action dated Aug. 28, 2013 issued in connection with Chinese Application No. 200980153730.2, with English translation.
Office Action dated Sep. 23, 2013 issued in connection with U.S. Appl. No. 12/331,186.
Office Action dated Sep. 24, 2013 issued in connection with U.S. Appl. No. 12/202,097.
Office Action dated Jul. 30, 2013 issued in connection with U.S. Appl. No. 12/331,181.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Third Office Action dated Aug. 29, 2013 issued in connection with Chinese Application No. 2008801283369.
Mexican Office Action mailed Dec. 17, 2013 issued in connection with Application No. MX/a/2010/008238.
Notice of Allowance mailed Nov. 18, 2013 issued in connection with U.S. Appl. No. 13/854,825.
Notice of Allowance mailed Dec. 26, 2013 issued in connection with U.S. Appl. No. 12/869,645.
Notice of Allowance mailed Nov. 26, 2013 issued in connection with U.S. Appl. No. 12/331,181.
Notice of Reasons for Rejection mailed Dec. 20, 2013 issued in connection with Japanese Application No. 2010-544399 with English translation.
Office Action dated Nov. 5, 2013 issued in connection with U.S. Appl. No. 13/715,765.
Office Action dated Dec. 17, 2013 issued in connection with U.S. Appl. No. 12/331,195.
Office Action dated Nov. 6, 2013 issued in connection with U.S. Appl. No. 13/221,692.
Office Action mailed Nov. 5, 2013 issued in connection with U.S. Appl. No. 12/267,471.
Office Action mailed Dec. 10, 2013 issued in connection with U.S. Appl. No. 14/032,657.

* cited by examiner

PRECALCULATED CALLER-AGENT PAIRS FOR A CALL CENTER ROUTING SYSTEM

BACKGROUND

The present invention relates to the field of routing phone calls and other telecommunications in a contact center system.

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals acquired by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

In an outbound contact center environment using telephone devices, the contact center or its agents are typically provided a "lead list" comprising a list of telephone numbers to be contacted to attempt some solicitation effort, such as attempting to sell a product or conduct a survey. The lead list can be a comprehensive list for all contact centers, one contact center, all agents, or a sub-list for a particular agent or group of agents (in any such case, the list is generally referred to in this application as a "lead list"). After receiving a lead list, a dialer or the agents themselves will typically call through the lead list in numerical order, obtain a live caller, and conduct the solicitation effort. In using this standard process, the eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion. Other attempts have been made to alter the general round-robin system. For example, U.S. Pat. No. 7,231,032 describes a telephone system wherein the agents themselves each create personal routing rules for incoming callers, allowing each agent to customize the types of callers that are routed to them. These rules can include a list of particular callers the agent wants routed to them, such as callers that the agent has interacted with before. This system, however, is skewed towards the agent's preference and does not take into account the relative capabilities of the agents nor the individual characteristics of the callers and the agents themselves.

BRIEF SUMMARY

Systems and methods of the present invention can be used to improve or optimize the routing of callers to agents in a contact center. According to one aspect of the present invention, methods and systems are provided for preprocessing or precalculating caller-agent pairs according to a pattern matching algorithm (where, e.g., the pattern matching algorithm may generally operate to compare caller data of one or more callers with agent data of one or more agents and output scores or predictions for an outcome associated with sales, cost, customer satisfaction, or the like). Precalculating possible caller-agent pairs for a set of agents and a set of callers prior to having callers in queue (or agents in queue), i.e., before a routing decision needs to be made by the call routing center. Precalculated scores of potential caller-agent pairs can be stored in a look-up table and retrieved when a routing decision is made, e.g., as callers call into a contact center or callers are reached in an outbound call center. Using a look-up table of precalculated caller-agent pairs may reduce the execution time of a routing engine, e.g., accessing a look-up table may be faster than running caller data and agent data of available agents (and/or callers) through the pattern matching algorithm at the time of routing.

In one aspect and example of the present invention, a computer implemented method for pre-processing caller-agent pairs in a call-center routing environment includes determining at least one agent data for each agent of a set of agents, determining at least one caller data for each caller of a set of callers, and determining a score for each possible caller-agent pair of the set of agents and the set of callers using the agent data and the caller data in a pattern matching algorithm. The scores for each possible caller-agent pair may then be stored, e.g., in a look-up table, for retrieval, where matching a caller of the set of callers to an agent of the set of agents is based on the previously determined or calculated scores.

In one example, the set of agents is greater than the agents that are free, e.g., including all agents logged into a call routing center regardless of whether they are free or busy. In another example, the set of agents includes all agents associated (e.g., employed) with a contact routing center or campaign, regardless of whether or not they are logged-in or working at any particular time. For example, the agent data of the set of agents, including all possible agents, can then be compared against caller data of a set of callers to determine a match.

The set of callers may include a set of potential callers. In one example, the set of callers may include callers within a particular area code, state, region, country, carrier, and so on. For example, a set of all callers that may potentially call a particular call routing center (e.g., millions or 100's of millions of callers). In some examples, a certain area code or other set of callers will be routed to a predefined set of agents and only those corresponding sets of callers and agents are precalculated. The caller data of the set of callers can then compared to the agent data of a set of agents as described.

In one example, exemplary routing or matching processes include performance based matching (e.g., ranking a set of agents based on performance and preferentially matching callers to the agents based on a performance ranking or score), pattern matching algorithms (e.g., comparing agent data associated with a set of callers to agent data associated a set of agents and determining a suitability score of different caller-agent pairs), affinity data matching, and other models for matching callers to agents. The methods may therefore operate to output scores or rankings of the callers, agents, and/or caller-agent pairs for a desired optimization (e.g., for optimizing cost, revenue, customer satisfaction, combinations thereof, and so on).

Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

DETAILED DESCRIPTION OF THE INVENTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Broadly speaking, and in one example, exemplary systems and methods are provided to improve or optimize the routing of callers to agents in a contact center. In one example, a system and process for calculating potential or possible caller-agent pairs according to a pattern matching algorithm are described. For example, precalculating all potential caller-agent pairs for a set of agents and a set of callers prior to having callers in queue (or agents in queue awaiting connection to an incoming caller). Precalculated scores of potential caller-agent pairs according to a pattern matching algorithm can be stored in a look-up table and retrieved when a routing decision is to be made, e.g., as callers call into a contact center or callers are reached in an outbound call center. The use of a look-up table of precalculated caller-agent pairs may reduce the execution time of a routing engine compared to running caller data and agent data of available agents (and/or callers) through the pattern matching algorithm.

Initially, exemplary call routing systems and methods utilizing pattern matching algorithms and computer models are described. This description is followed by exemplary systems and methods for precalculating and storing possible caller-agent pairs based on calculated outcomes of the pattern matching algorithms and computer models. For example, systems and methods for passing caller and agent data through pattern matching algorithms and computer models to increase the chance of an optimal interaction.

Figure 1:
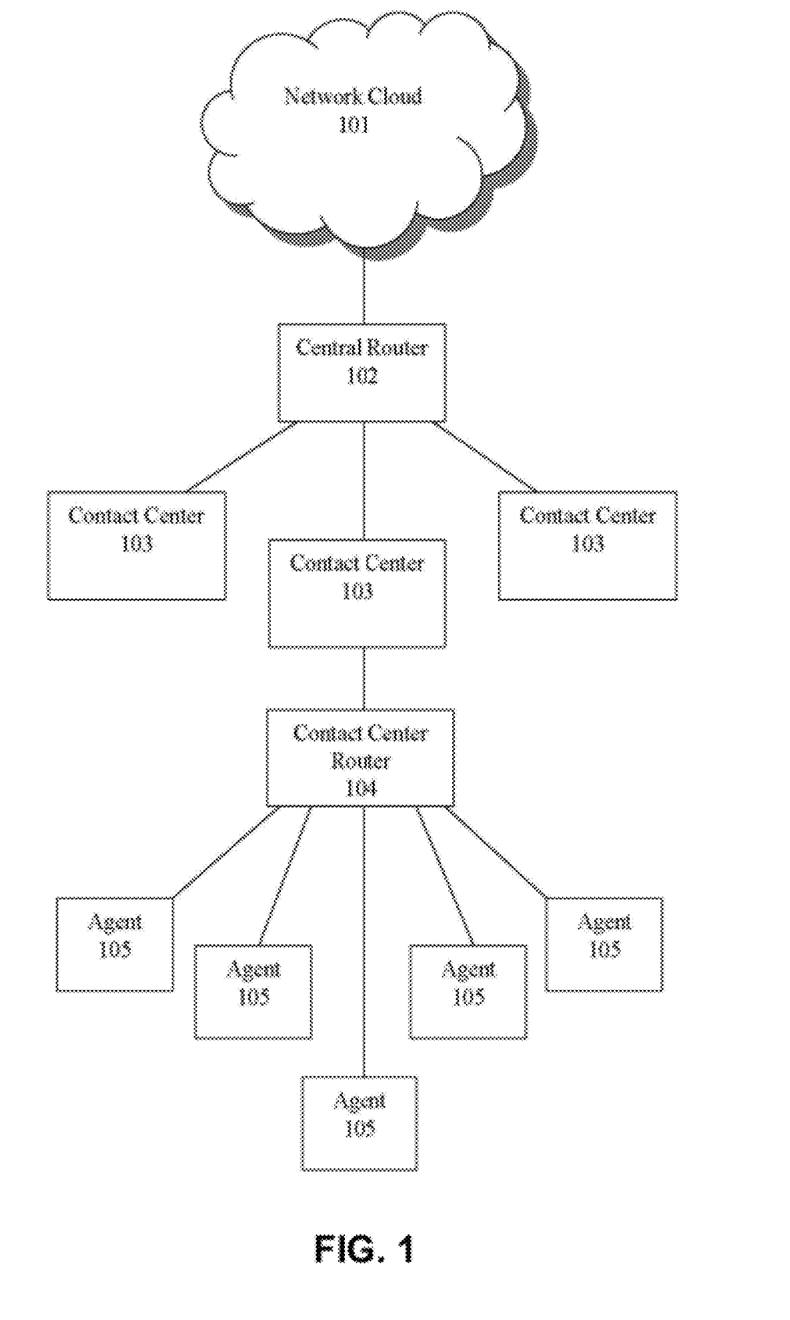
FIG. 1 is a diagram reflecting the general setup of a contact center operation.

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105.

Figure 2:
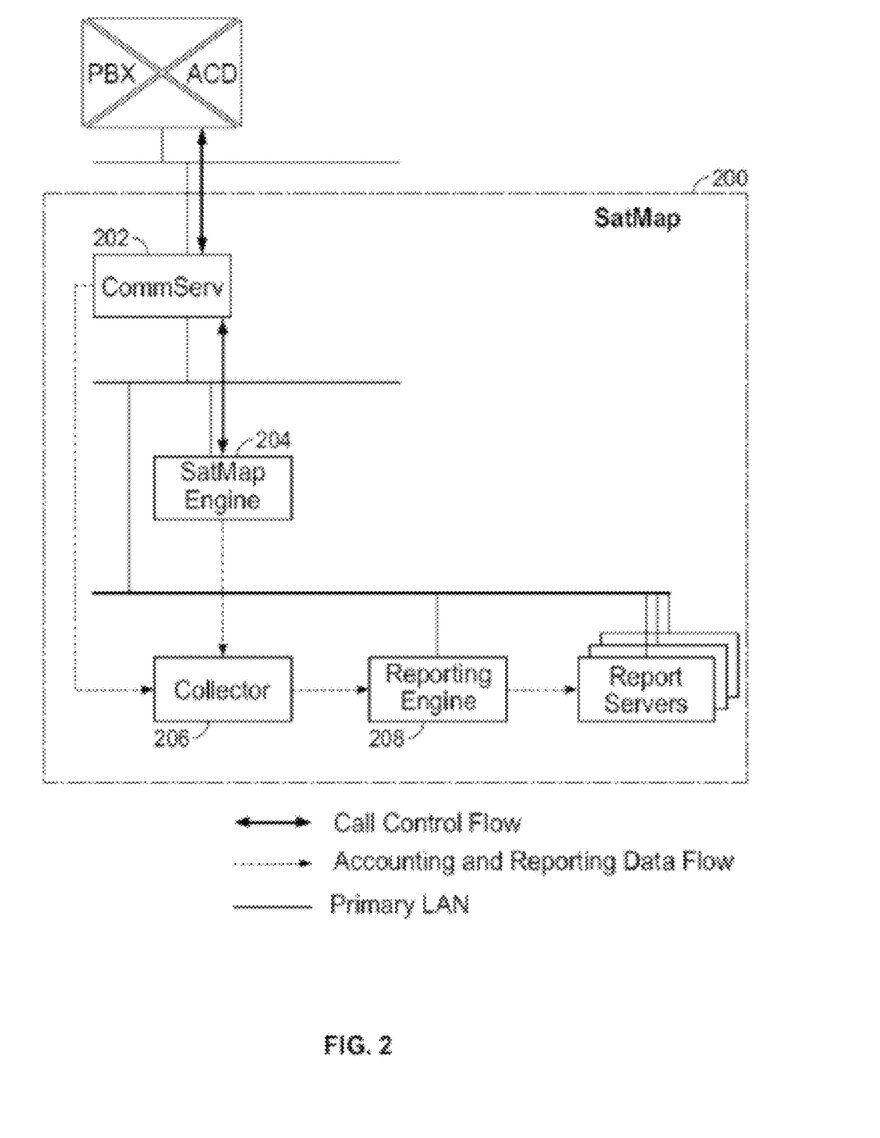
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part, on agent performance or pattern matching algorithms using caller data and/or agent data. Routing system 200 may include a communication server 202 and a routing engine 204 (referred to at times as "SatMap" or "Satisfaction Mapping") for receiving and matching callers to agents (referred to at times as "mapping" callers to agents).

Routing engine 204 may operate in various manners to match callers to agents based on performance data of agents, pattern matching algorithms, and computer models, which may adapt over time based on the performance or outcomes of previous caller-agent matches. In one example, the routing engine 204 includes a neural network based adaptive pattern matching engine. Various other exemplary statistical or pattern matching and computer model systems and methods which may be included with content routing system and/or routing engine 204 are described, for example, in U.S. Ser. No. 12/021,251, filed January 28, U.S. Serial No. 2008, Ser. No. 12/202,091, filed Aug. 29, 2008, and U.S. Ser. No. 12/266,461, filed Nov. 6, 2008, all of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, and the like. Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
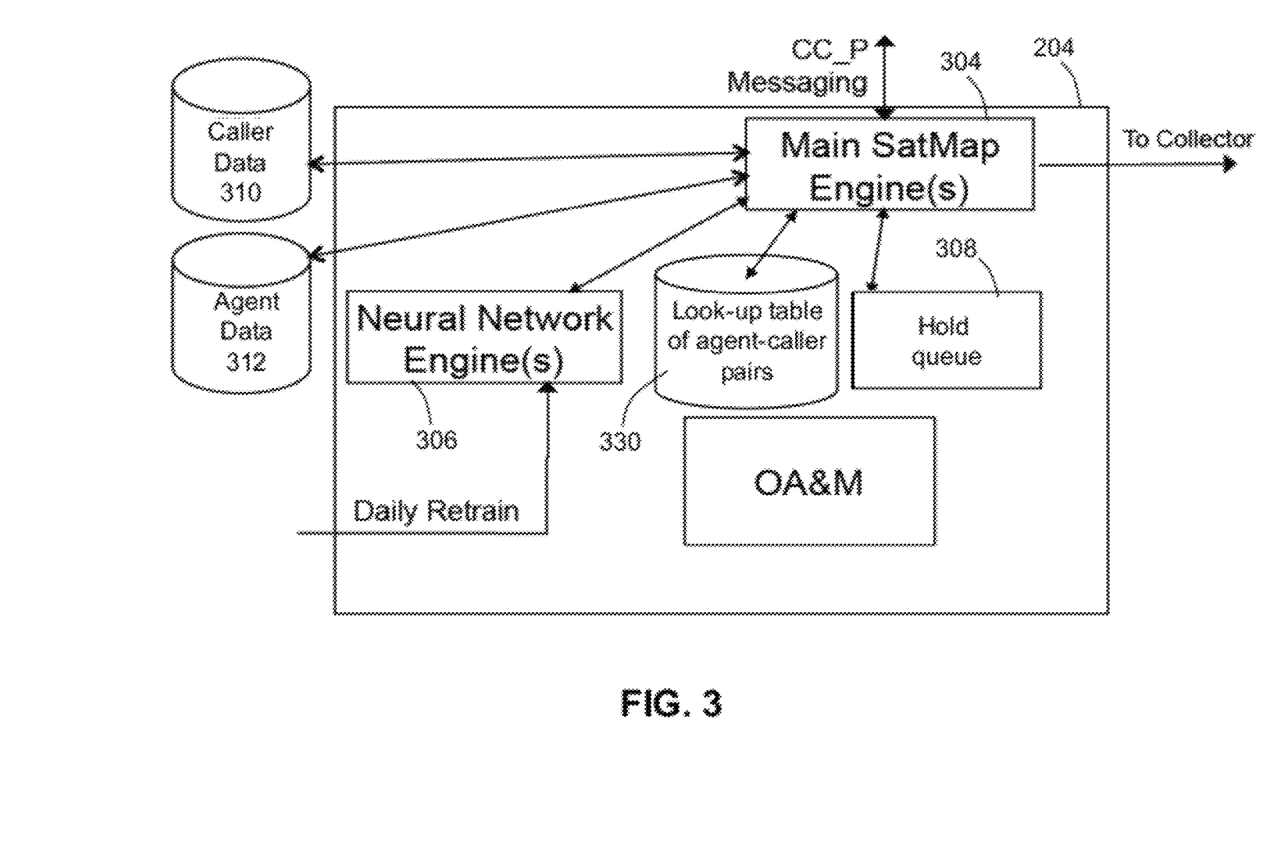
FIG. 3 illustrates an exemplary routing system having a mapping engine for routing callers based on performance and/or pattern matching algorithms.

FIG. 3 illustrates detail of exemplary routing engine 204. Routing engine 204 includes a main mapping engine 304, which receives caller data and agent data from databases 310 and 312. In some examples, routing engine 204 may route callers based solely or in part on performance data associated with agents. In other examples, routing engine 204 may make routing decisions based solely or in part on comparing various caller data and agent data, which may include, e.g., performance based data, demographic data, psychographic data, and other business-relevant data. Additionally, affinity databases (not shown) may be used and such information received by routing engine 204 for making routing decisions.

In one example, routing engine 204 includes or is in communication with one or more neural network engines 306. Neural network engines 306 may receive caller and agent data directly or via routing engine 204 and operate to score caller-agent pairs based on pattern matching algorithms and computer models generated to increase the changes of desired outcomes. Further, as indicated in FIG. 3, call history data (including, e.g., caller-agent pair outcomes with respect to cost, revenue, customer satisfaction, etc.) may be used to retrain or modify the neural network engine 306.

In one example, routing engine includes or is in communication with a look-up table stored in database 330, the look-up table storing pre-calculated caller-agent pair scores. For instance, as described herein, agent data for a set of agents and caller data for a set of agents may be passed through a pattern matching algorithm, e.g., neural network engines 306, in advance of calls being made or received. The output scores from the neural network engine 306, e.g., associated with the chance of a desired outcome, are stored in database 330. As a caller calls in (or is reached in an outbound center), routing engine 204 may look-up possible caller-agent pair scores (as opposed to computing scores via neural network engine 306 after the call comes in) based on available agents and callers in queue and determine which caller-agent pair to connect.

Routing engine 204 may further include or be in communication with hold queue 308, which may store or access hold or idle times of callers and agents, and operates to map callers to agents based on queue order of the callers (and/or agents). Mapping engine 304 may operate, for example, to map callers based on a pattern matching algorithm, e.g., as included with neural network engine 306, or based on queue order, e.g., as retrieved from hold queue 308.

Figure 4:
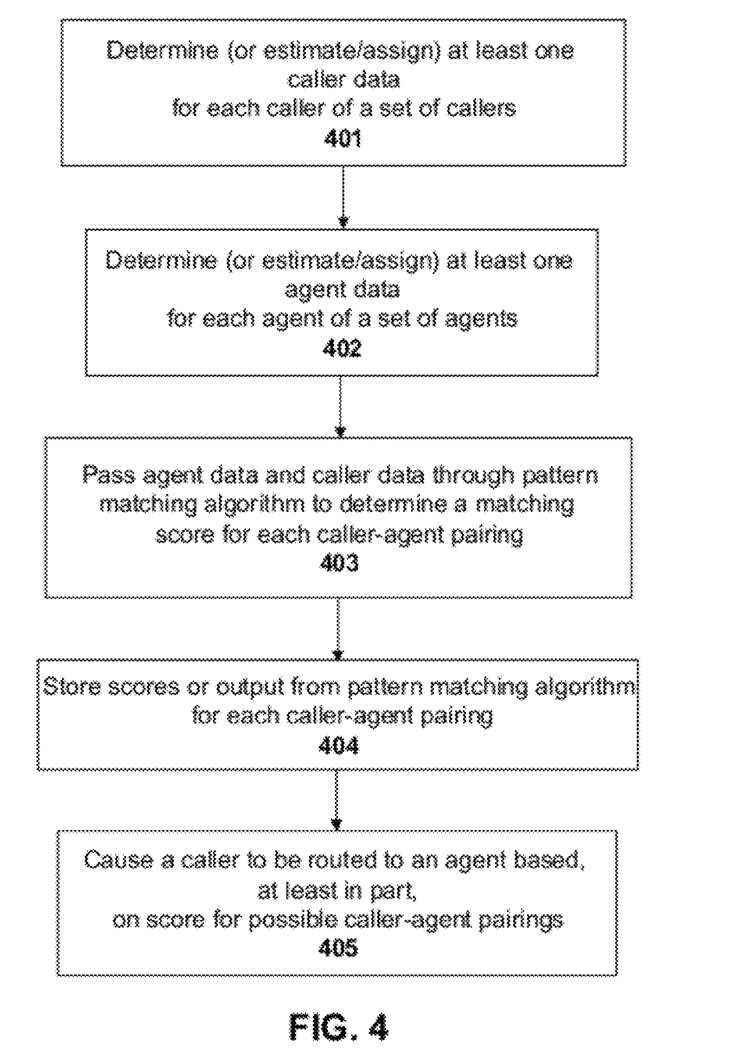
FIG. 4 illustrates an exemplary process for using agent data and caller data in a pattern matching algorithm to determine suitability scores for caller-agent pairs.

FIG. 4 illustrate an exemplary process for passing caller data of a set of callers and agent data of a set of callers through a pattern matching algorithm to construct a look-up table for caller-agent pairs. In one example, the pattern matching algorithm may combine agent performance characteristics or grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences. It will be appreciated that the acts outlined in the flowchart of FIG. 4 need not occur in that exact order.

The exemplary process generally includes determining at least one caller data for each caller of a set of callers, determining at least one agent data for each of a set of agents, using the agent data and the caller data in a pattern matching algorithm, and determining a suitability score for each caller-agent pair. In one particular example, at 401, at least one caller data (such as a caller demographic or psychographic data) is determined for each of a set of callers. One way of accomplishing this is by retrieving this from available databases by using the caller's contact information as an index. Available databases include, but are not limited to, those that are publicly available, those that are commercially available, or those created by a contact center or a contact center client. Other business-relevant data such as historic purchase behavior, current level of satisfaction as a customer, or volunteered level of interest in a product may also be retrieved from available databases.

In one example, phone numbers can be looked up in a commercial database, e.g., Acxiom or the like), which may provide caller data such as age (which may be converted to binary ranges, e.g., <20, 20-30, 30-40, etc.), gender, ethnicity (which may be converted to binary variables, e.g., Caucasian, Hispanic, African American, etc.). In another example, the first 6 digits of a phone number (generally known as "NPANXX") in a census database to retrieve demographics of 10,000 number blocks (used to be called exchange). This information can provide additional caller data such as median house value, median income, divorce rate, etc. (which can be segmented into binary ranges).

Additionally, caller data may include the type of phone associated with the phone number, e.g., a residential number, mobile number, business number and so on, which may generally be determined from Billing Telephone Number (BTN) data.

At 402, at least one agent data for each of a set of agents is determined, which may include performance characteristic data as well as demographic or psychographic data. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser.

Though this example uses agent performance characteristics or grades, demographic, psychographic, and other business-relevant data, along with caller demographic, psychographic, and other business-relevant data, other examples can eliminate one or more types or categories of caller or agent data to minimize the computing power or storage necessary to employ the present invention.

Once agent data and caller data have been collected, this data is passed to a computational system. The computational system then, in turn, uses this data in a pattern matching algorithm at 403 to create a computer model that matches each agent with each caller and estimates the probable outcome of each matching along a number of optimal interactions, such as the generation of a sale, the duration of contact, or the likelihood of generating an interaction that a customer finds satisfying.

In one example, the pattern matching algorithm can comprise a correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can predict the chance of an optimal interaction in the context of matching a caller having a particular set of caller data, with an agent having a particular set of agent data. Preferably, the pattern matching algorithm is periodically refined as more actual data on caller interactions becomes available to it, such as periodically training the algorithm every night after a contact center has finished operating for the day.

In one particular example, for each output variable of the pattern matching algorithm, a resilient back-propagation (RPROP) neural network may be trained. It will be understood that a RPROP neural network is a learning heuristic for use in neural network architectures for providing an update mechanism based on past outcomes to improve the output of the algorithm over time. Further, examples may include determining a Z-score (e.g., a dimensionless standard score) for each of two or more variable outputs of the pattern matching algorithm, and weighted against each other as desired by a call center. (Output variables may include or be associated with, for example, revenue generation, cost, customer satisfaction, and the like.) Such exemplary processes are described, e.g., in copending U.S. patent application Ser. No. 12/202,091; U.S. Publication no. 2009/0190747 A1, the contents of which are incorporated herein by reference.

The pattern matching algorithm may be used to create a computer model reflecting the predicted chances of an optimal interaction for each potential caller-agent pair. For example, a computer model may comprise the predicted chances for a set of optimal interactions for every agent of the set of agents against every caller of the set of callers. Alternatively, the computer model can comprise subsets of these, or sets containing the aforementioned sets. For example, instead of matching every agent logged into the contact center with every available caller, the example can match every available agent with every available caller, or even a narrower subset of agents or callers. Likewise, the exemplary method can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used to determine which agents should be connected to which callers.

The suitability scores are then stored, for example, in a look-up table accessible by the call routing center when a routing decision is to be made, e.g., stored in a database as illustrated in FIG. 3. For example, when a caller calls in and is connected with the call routing center, the system can quickly compare the caller to agents in queue (or logged in) and use the previously calculated suitability scores or rankings to determine which agent the caller should be connected to. As described, the call routing center may be able to determine a caller-agent pair via a look-up table (or otherwise previously stored caller-agent data) in a shorter amount of time then running the caller data and available agent data through a pattern matching algorithm and/or computer model on the fly. Similarly, in an outbound call center, e.g., using a lead list, as a caller is reached the system looks-up the suitability scores as determined by the pattern matching algorithm or computer model and connects the caller based on the highest scoring caller-agent pair.

As an illustrative example, a call routing center might consider a set of 100 million phone numbers and a set of 1,000 agents. If all callers and agents are distinct then the method and system would calculates 10^11 values for the look-up table. In some examples, however, some or all of the caller data and agent data are (or may be converted to) binary values. Accordingly, if the system considers 20 variable caller and agent data inputs, then the number of possible different calculations is only 10^6.

In some examples, caller data and agent values are continuous, e.g., age, income, and so on. In such instances, combinatorial explosion issues may be diminished by discretizing the continuous variables into a limited number of values (e.g., dividing ages into ranges). The cost by discretizing a continuous variable would be accuracy on the forecast of the target variable; however, this generally will not pose a serious problem as the system generally will only need to distinguish the best caller-agent pairing out of small number of potential pairings, e.g., between 10 and 100 potential caller-agent pairings corresponding to one agent available and 10 and 100 callers in queue.

In other examples, the set of callers may be limited, e.g., to a particular area code or codes, regions (e.g., a state or geographical regions such as the Northeastern states of the United States), countries, and so on. Limiting the number of callers may reduce the number of scores, i.e., reduce the size of the look-up table.

At 405, a caller and agent are routed based, at least in part, on the score for possible caller-agent pairs. For example, as a an agent becomes free and callers are in queue, the process may retrieve all potential caller-agent pairs from the previously calculated look-up table and route the best matching caller (subject to any connection or routing rules such as hold thresholds, etc. as described herein) to the free agent. Further, if multiple agents are free, and one or more callers are incoming, the scores for all potential caller-agent pairs of the free agents and one or more callers are retrieved for making a routing decisions. It is noted that in a case where a caller and/or agent is not found in the look-up table the pattern matching algorithm may operate in real-time to compare potential caller-agent pairs.

Figure 5:
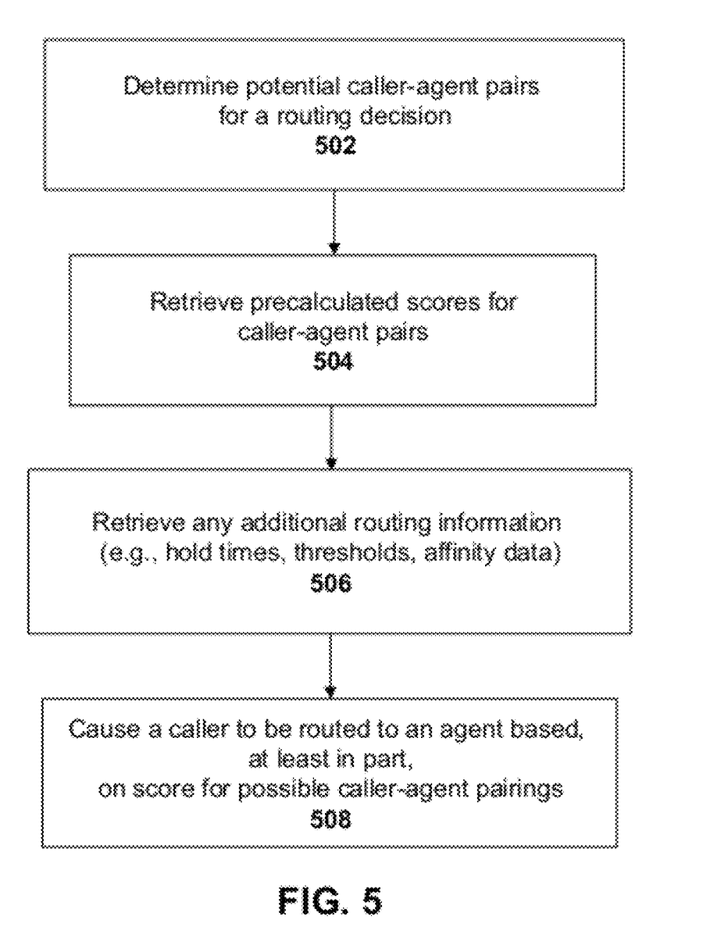
FIG. 5 illustrates an exemplary process for retrieving caller-agent pair scores for routing a caller to an agent.

FIG. 5 illustrates an exemplary process for using precalculated caller-agent pairs for matching callers to agents. At 502, one or more callers and one or more agents are identified for potential routing. For example, available agents and callers in queue are identified. In other examples, available agents and one or more callers connected from a lead list might be identified. Precalculated scores for potential caller-agent pairs are retrieved at 504. For example, all possible combinations of identified callers (e.g., in queue) and available agents can be retrieved. Additional information, such as hold times of callers (or waiting time of agents) may further be retrieved at 506, which may be used to influence the routing decision. The process causes a caller and agent to be connected at 508 based, at least in part, on the retrieved precalculated scores (at 504), and on any additional routing information (if applicable, as determined at 506).

In one example, connection rules are applied to define when or how to connect agents that are matched to a caller. The connection rules can be as simple as instructing the present invention to connect a caller according to the best match (e.g., based on stored scores) among all available agents with that particular caller. In this manner, caller hold time can be minimized. The connection rules can also be more involved, such as connecting a caller only when a minimum threshold match exists between an available agent and a caller, to allow a defined period of time to search for a minimum matching or the best available matching at that time, or to define an order of agent suitability for a particular caller and connect the caller with a currently available agent in that order with the best chances of achieving an optimal interaction. The connection rules can also purposefully keep certain agents available while a search takes place for a potentially better match.

It is typical for a queue of callers on hold to form at a contact center. When a queue has formed it is desirable to minimize the hold time of each caller in order to increase the chances of obtaining customer satisfaction and decreasing the cost of the contact, which cost can be, not only a function of the contact duration, but also a function of the chance that a caller will drop the contact if the wait is too long. After matching the caller with agents, the connection rules can thus be configured to comprise an algorithm for queue jumping, whereby a favorable match of a caller on hold and an available agent will result in that caller "jumping" the queue by increasing the caller's connection priority so that the caller is passed to that agent first ahead of others in the chronologically listed queue. The queue jumping algorithm can be further configured to automatically implement a trade-off between the cost associated with keeping callers on hold against the benefit in terms of the chance of an optimal interaction taking place if the caller is jumped up the queue, and jumping callers up the queue to increase the overall chance of an optimal interaction taking place over time at an acceptable or minimum level of cost or chance of customer satisfaction. Callers can also be jumped up a queue if an affinity database indicates that an optimal interaction is particularly likely if the caller is matched with a specific agent that is already available.

The connection rules may be configured to avoid situations where matches between a caller in a queue and all logged-in agents are likely to result in a small chance of a sale, but the cost of the contact is long and the chances of customer satisfaction slim because the caller is kept on hold for a long time while the system waits for the most optimal agent to become available. By identifying such a caller and jumping the caller up the queue, the contact center can avoid the situation where the overall chances of an optimal interaction (e.g., a sale) are small, but the monetary and satisfaction cost of the contact is high.

Further, in some examples, affinity data and affinity databases may be used, the affinity databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

In some examples, for an outbound call center and where a dialer is used to call through a lead list, upon obtaining a live caller, the system can determine the available agents, use the look-up table to match the live caller with one or more of the available agents, and connect the caller with one of those agents. Preferably, the system will match the live caller with a group of agents, define an ordering of agent suitability for the caller within that group, match the live caller to the highest-graded agent that is available in that ordering, and connect the caller to that highest-graded agent. In matching the live caller with a group of agents, the present invention can be used to determine a cluster of agents with similar agent data, such as similar demographic data or psychographic data, and further determine within that cluster an ordering of agent suitability. In this manner, the present invention can increase the efficiency of the dialer and avoid having to stop the dialer until an agent with specific agent data becomes available.

Additionally, in some examples, the connection rules may be influenced by the length of time a caller has been on hold, e.g., taking into account a pain threshold of the caller. For instance, the probability of increased revenue, customer satisfaction, and so on may vary based on the wait time a caller is held before routing to an agent. For example, if a caller is held too long based on a threshold or pain function for caller wait time, the probability of a predicted outcome may change (e.g., after one minute on hold the probability of a sale for the particular caller may drop tremendously). As such, the system may route a caller to an otherwise sub-optimum agent match based on the particular pattern matching algorithms or look-up table scores. For example, the desired output may be to maximize revenue, however, after a pain threshold is reached for a caller, the system may route the caller in a fashion more heavily weighting customer satisfaction.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 6:
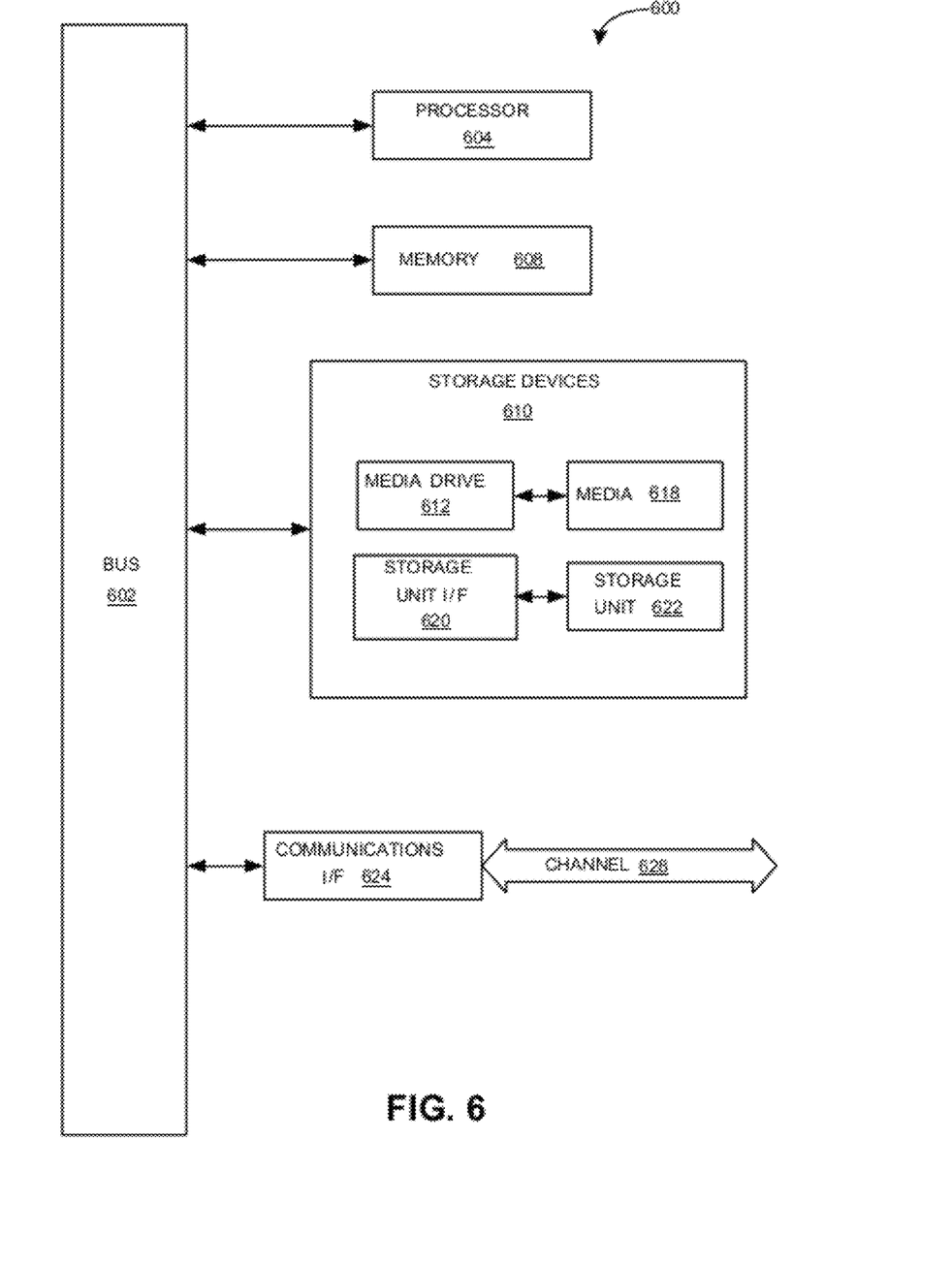
FIG. 6 illustrates a typical computing system that may be employed to implement some or all processing functionality in certain embodiments of the invention.

FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 608, storage media 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage media 618, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made without departing from the invention in its broader aspects. The appended claims encompass such changes and modifications within the spirit and scope of the invention.

We claim:

1. A computer implemented method for pre-processing caller-agent pairs in a call-center routing environment, the method comprising the acts of:
   determining, by one or more computers, at least one agent data for each agent of a set of agents, wherein the agent data comprises one or more of demographic data or psychographic data;
   determining, by the one or more computers, at least one caller data for each potential future caller of a set of potential future callers selected based on one or more criteria, wherein the caller data comprises one or more of demographic data or psychographic data;
   determining for each of the selected potential future callers, by the one or more computers, multiple scores, with each of the scores comprising a score for the respective potential future caller paired with a different one of the agents in the set of agents to obtain respective scores for different caller-agent pairs for the respective future caller using the agent data and the caller data in a multi-data element pattern matching algorithm that matches at least one or more of demographic data or psychographic data, to increase the chance of an optimal interaction;
   storing, by the one or more computers, the determined scores for caller-agent pairs;
   obtaining, by the one or more computers, call connections to a set of callers including to one of the potential future callers;
   retrieving, by the one or more computers, the scores for multiple of the caller-agent pairs for the one potential future caller; and
   matching, by the one or more computers, the call connection to the one potential future caller to one of the agents based at least in part on the stored scores of caller-agent pairs retrieved for the one potential future caller.

2. The method of claim 1, further comprising storing the scores for caller-agent pair in a look-up table.

3. The method of claim 1, wherein determining caller data comprises retrieving caller data from a database based on the phone number of the caller.

4. The method of claim 1, wherein determining caller data comprises retrieving average caller data for a group of phone numbers including the phone number of the caller.

5. The method of claim 1, wherein the caller data is determined from a commercial database.

6. The method of claim 1, wherein determining the caller data further comprises determining the caller's account number.

7. The method of claim 1, wherein determining the caller data comprises determining a type of phone associated with the caller.

8. The method of claim 7, wherein the type of phone is determined from Billing Telephone Number (BTN) data associated therewith.

9. The method of claim 7, wherein the type of phone comprises one or more selected from the group of a residential phone number, mobile phone number, and business phone number.

10. The method of claim 1, wherein the agent data comprises demographic data, wherein the demographic data comprises one or more of gender, race, age, education, accent, income, nationality, ethnicity, area code, zip code, region, marital status, job status, or credit score.

11. The method of claim 1, wherein the caller data comprises demographic data, wherein the demographic data comprises one or more of gender, race, age, education, accent, income, nationality, ethnicity, area code, zip code, region, marital status, job status, or credit score.

12. The method of claim 1, wherein one of the one or more criteria is age.

13. The method of claim 1, wherein one of the one or more criteria is gender.

14. The method of claim 1, wherein one of the one or more criteria is selected from the group of a range of house value, and a range of income.

15. A system for routing callers to agents in a call center routing environment, comprising:
   one or more computers configured with program code, that when executed, performs the step:
   determining, by the one or more computers, at least one agent data for each agent of a set of agents, wherein the agent data comprises one or more of demographic data or psychographic data;
   determining, by the one or more computers, at least one caller data for each potential future caller of a set of potential future callers, selected based on one or more criteria, wherein the caller data comprises one or more of demographic data or psychographic data;
   determining for each of the selected potential future callers, by the one or more computers, multiple scores, with each of the scores comprising a score for the respective potential future caller paired with a different one of the agents in the set of agents to obtain respective scores for different caller-agent pairs for the respective future caller using the agent data and the caller data in a multi-data element pattern matching algorithm that matches at least one or more of demographic data or psychographic data, to increase the chance of an optimal interaction;

storing, by the one or more computers, the determined scores for each possible caller-agent pair;

obtaining, by the one or more computers, call connections to a set of callers including to one of the potential future callers;

retrieving, by the one or more computers, the scores for multiple of the caller-agent pairs for the one potential future caller; and matching, by the one or more computers, the call connection to the one potential future caller to one of the agents based at least in part on the stored scores of caller-agent pairs retrieved for the one potential future caller.

16. The system of claim 15, further comprising logic for storing the score for each possible caller-agent pair in a look-up table.

17. The system of claim 15, wherein determining caller data comprises retrieving caller data from a database based on the phone number of the caller.

18. The system of claim 15, wherein determining caller data comprises retrieving average caller data for a group of phone numbers including the phone number of the caller.

19. The system apparatus of claim 15, wherein determining the caller data comprises determining a type of phone associated with the caller.

20. The system of claim 19, wherein the type of phone is determined from Billing Telephone Number (BTN) data associated therewith.

21. The system of claim 20, wherein the type of phone comprises one or more selected from the group of a residential phone number, mobile phone number, and business phone number.

22. The system of claim 15, wherein one of the one or more criteria is age.

23. The system of claim 15, wherein one of the one or more criteria is gender.

24. The system of claim 15, wherein one of the one or more criteria is selected from the group of a range of house value, and a range of income.

25. A non-transitory computer readable storage medium comprising computer readable instructions for carrying out, when executed by one or more computers, the method of:

determining, by the one or more computers, at least one agent data for each agent of a set of agents wherein the agent data comprises one or more of demographic data or psychographic data;

determining, by the one or more computers, at least one caller data for each potential future caller of a set of potential future callers, selected based on one or more criteria, wherein the caller data comprises one or more of demographic data or psychographic data determining for each of the selected potential future callers, by the one or more computers, multiple scores, with each of the scores comprising a score for the respective potential future caller paired with a different one of the agents in the set of agents to obtain respective scores for different caller-agent pairs for the respective future caller using the agent data and the caller data in a multi-data element pattern matching algorithm that matches at least demographic data, to increase the chance of an optimal interaction;

storing, by the one or more computers, the determined scores for each possible caller-agent pair;

obtaining, by the one or more computers, call connections to a set of callers including to one of the potential future callers;

retrieving, by the one or more computers, the scores for multiple of the caller-agent pairs for the one potential future caller; and matching, by the one or more computers, the call connection to the one potential future caller to one of the agents based at least in part on the stored scores of caller-agent pairs retrieved for the one potential future caller.

26. The computer readable storage medium of claim 25, wherein one of the one or more criteria is age.

27. The computer readable storage medium of claim 25, wherein one of the one or more criteria is gender.

28. The computer readable storage medium of claim 25, wherein one of the one or more criteria is selected from the group of a range of house value, and a range of income.

* * * * *